No. 852,448. PATENTED MAY 7, 1907.
P. B. MILES.
MOLD.
APPLICATION FILED AUG. 2, 1906.

Witnesses
M. A. Schmidt
Geo. E. Few

Inventor
Perry B. Miles
By Milo B. Stevens & Co.
Attorneys

THE NORRIS PETERS CO., WASHINGTON, D. C.

UNITED STATES PATENT OFFICE.

PERRY B. MILES, OF JACKSON, MICHIGAN.

MOLD.

No. 852,448.  Specification of Letters Patent.  Patented May 7, 1907.

Application filed August 2, 1906. Serial No. 328,919.

*To all whom it may concern:*

Be it known that I, PERRY B. MILES, a citizen of the United States, residing at Jackson, in the county of Jackson and State of Michigan, have invented new and useful Improvements in Molds, of which the following is a specification.

This invention relates to molds used for making building blocks, and embodies particularly a mold having separable parts and a novel form of combined hinge and clamp for joining the parts together. The use of one of said hinges and clamps at each corner allows the mold to be opened at any corner.
The clamp is so constructed that it can be quickly operated, to lock or unlock the corners. Means are also provided to allow some adjustment at the corners.

Figure 1:
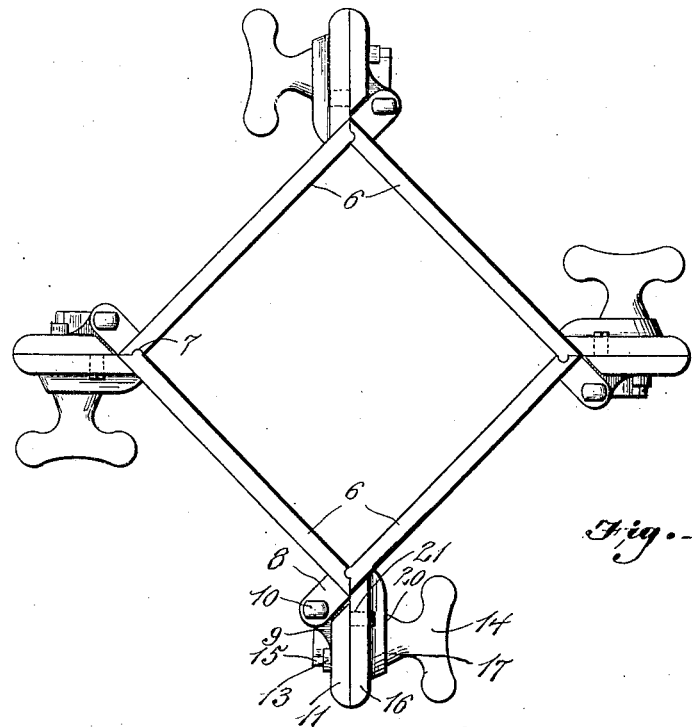
Figure 2:
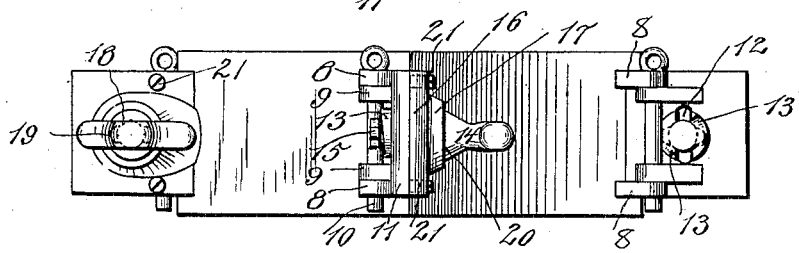
Figure 3:
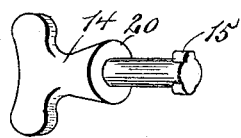
Figure 4:
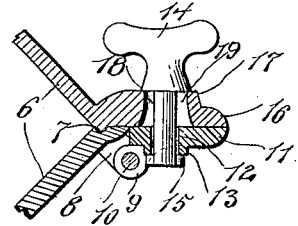

In the accompanying drawings, Figure 1 is a plan view of the mold set up. Fig. 2 is a side elevation. Fig. 3 is a detail in perspective of one of the clamping keys, removed. Fig. 4 is a detail in horizontal section through one of the clamps.
The mold, as shown, has four sides 6, the ends of which are tongued and grooved as at 7 to make a good fit. The sides are held together when set up by combined hinges and clamps.
Each side has at one end a pair of ears 8, projecting outwardly, to which is pivoted, by spaced knuckles 9 and bolt 10, one member or plate 11 of the clamp. This plate has an opening 12 around which, on the outer face of the plate, are a pair of inclined or cam ribs 13. The opening is elongated vertically to allow the passage of the lugs 15 on the end of the clamping key 14, and these lugs engage the cams and when the key is turned draw the clamping plates together. The other clamping plate 16 projects obliquely at the opposite end of the side 6 and is embossed as at 17 to form a cavity on the under side. The boss has an opening 18 with extensions 19 to allow the passage of the key, and these extensions are set at a right angle to the extensions of the hole in the opposite plate 11. The shoulder 20 of the clamping key comes against the boss when the parts are tightened.

To secure an adjustment, and perfect fit at the corners, the clamping plates 16 are tapped to receive screws 21 the inner ends of which bear against the opposite plates 11 and enable the clamping plates to be spaced apart to a slight extent if and when necessary to make a good fit at the corners.

When the mold is set up the clamping plates are faced together and the locking keys inserted, and by turning the keys the clamps are drawn together and the parts thus securely fastened. To open the mold and remove the block, the locking key of one of the clamps is loosened, which allows all the sides to swing apart, on the hinges of the other clamps, and the other clamps do not have to be loosened, because the pins or pivotal points of the hinges are located beyond or outside the extreme ends of the sides, so that the sides can and will swing outwardly or away from the block on the hinges of the other clamps without loosening such clamps. In other words, the fact that a clamp is locked will not prevent the swing of the sides connected thereto. This assures a rapid and good delivery even for blocks having patterned faces, since all sides of the mold can be removed without disturbing the block. However, more than one of the clamps may be loosened if necessary in consequence of a particularly irregular or under-cut pattern.

By having one clamping plate embossed, as shown, with the axis of the opening therein at a right angle to that of the opening in the opposite plate, the key will not readily drop out, since after turning it to the unlocking position another quarter turn is necessary to remove it entirely. Hence the key will ordinarily hang in the plate 16 and is not apt to accidentally drop out in the manipulation of the mold.

I claim:

1. A mold having sides which meet at the corners and are joined by separable clamps to which the sides are hinged, the hinges being located beyond the ends of the sides, at the corners, so that the sides will swing away from the block on the hinge of any clamp, without loosening such clamp.

2. A mold comprising sides and corner clamps connecting the same, each clamp consisting of a pair of plates one of which is hinged to one side and the other of which is rigid with another side, and a locking device engaging both plates to bind the same together, the sides being capable of swinging on the hinges while the clamp is engaged.

3. A clamp for mold sections, comprising a plate rigid with one section and a plate hinged to another section, said plates having registering openings, and a locking device extending through the openings and engaging the plates to bind the same together independently of the mold sections.

4. A clamp for mold sections, comprising a plate rigid with one section and having a boss with an elongated opening therethrough, a plate hinged to another section and having an elongated opening therethrough at an angle to said opening and registering therewith, and having also inclines around said opening, and a locking key extending through the openings and having lugs bearing upon said inclines.

In testimony whereof I have signed my name to this specification in the presence of two subscribing witnesses.

PERRY B. MILES.

Witnesses:
 STANLEY J. YOUNG,
 ELMER H. OVERSMITH.